United States Patent
Colombo et al.

(10) Patent No.: US 8,683,424 B2
(45) Date of Patent: Mar. 25, 2014

(54) BRIDGING THE GAP BETWEEN HIGH LEVEL USER REQUIREMENTS AND AVAILABILITY MANAGEMENT FRAMEWORK CONFIGURATIONS

(75) Inventors: Pietro Colombo, Venegono Inferiore (IT); Pejman Salehi, Mississauga (CA); Ferhat Khendek, Montreal (CA); Maria Toeroe, Montreal (CA); Ali Kanso, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 13/342,767

(22) Filed: Jan. 3, 2012

(65) Prior Publication Data
US 2013/0091485 A1 Apr. 11, 2013

Related U.S. Application Data

(60) Provisional application No. 61/545,408, filed on Oct. 10, 2011.

(51) Int. Cl.
*G06F 9/00* (2006.01)
*G06F 11/00* (2006.01)
*G06F 9/44* (2006.01)
*G06F 9/46* (2006.01)

(52) U.S. Cl.
USPC .......... 717/101; 713/1; 714/1; 717/168; 718/105

(58) Field of Classification Search
None
See application file for complete search history.

(56) References Cited

U.S. PATENT DOCUMENTS

| | | | |
|---|---|---|---|
| 7,437,460 B2 * | 10/2008 | Chidambaran et al. | 718/105 |
| 2008/0065466 A1 * | 3/2008 | Liu et al. | 705/10 |
| 2008/0244552 A1 * | 10/2008 | Toeroe | 717/168 |
| 2009/0164767 A1 * | 6/2009 | Kanso et al. | 713/1 |
| 2009/0164832 A1 * | 6/2009 | Kanso et al. | 714/1 |
| 2009/0265699 A1 * | 10/2009 | Toeroe | 717/168 |
| 2011/0035738 A1 * | 2/2011 | Toeroe et al. | 717/168 |

OTHER PUBLICATIONS

Roger N. Jones, An Environmental Risk Assessment/Management Framework for Climate Change Impact Assessments, 2001, [Retrieved on May 3, 2013]. Retrieved from the internet: <URL: http://link.springer.com/content/pdf/10.1023%2FA%3A1011148019213.pdf> 34 Pages (197-230).*

(Continued)

*Primary Examiner* — Don Wong
*Assistant Examiner* — Anibal Rivera
(74) *Attorney, Agent, or Firm* — Blakely, Sokoloff, Taylor & Zafman, LLP

(57) ABSTRACT

Configuration requirements for an Availability Management Framework (AMF) configuration are generated from high level user requirements that specify a subset of properties of an AMF configuration. The user requirements are first mapped into entity prototypes defined in an extended Entity Types File (ETF) model. A computer system identifies additional entity prototypes and dependency thereof that support functionalities of the mapped entity prototypes under a set of grouping conditions. The computer system calculates the required number of component service instances (CSIs) and service instances (SIs) that satisfy the user requirements. The calculation is based on the subset of the properties specified by the user requirements and measurements associated with the entity prototypes in the extended ETF model. The computer system then forms configuration requirements including the required number of CSIs and SIs for generating the AMF configuration that satisfies the user requirements.

18 Claims, 9 Drawing Sheets

(56) References Cited

OTHER PUBLICATIONS

P. Salehi et al., A UML-Based Domain Specific Modeling Language for the Availability Management Framework, 2010 IEEE, [Retrieved on May 3, 2013]. Retrieved from the internet: <URL: http://ieeexplore.ieee.org/stamp/stamp.jsp?tp=&arnumber=5634309> 10 Pages (34-44).*

Service Availability Forum, Service Availability Interface, Overview, SAI-Overview-B.05.01, (2010), cover page, pp. 21-36.

Service Availability Forum, Application Interface Specification, Availability Management Framework, SAI-AIS-AMF-B.04.01, (2010), cover page, pp. 33 and 35-60.

Service Availability Forum, Application Interface Specification, Software Management Framework, SAI-AIS-SMF-A.01.02, (2010), cover page, pp. 19-33.

Aggarwal, Rohit, et al., "Constraint Driven Web Service Composition in METEOR-S", IEEE Proceedings of International Conference on Services Computing (SCC 2004), (2004), 23-30.

Becker, Steffen, et al., "The Palladio Component Model for Model-Driven Performance Prediction", Journal of Systems and Software, 82(1), (2009), 3-22.

Erl, Thomas, "Service-Oriented Design (Part IV: Business Process Design)", Service-Oriented Architecture: Concepts, Technology, and Design, Chapter 16, Prentice Hall, (2005), 566-611.

Herold, Sebastian, et al., "Towards Bridging the Gap between Goal-Oriented Requirements Engineering and Compositional Architecture Development", SHARK-ADI '07: Proceedings of the Second Workshop on Sharing and Reusing Knowledge Architecture, Rationale and Design Intent, (2007), 6 pages.

Kanso, A., et al., "Automatic Generation of AMF Compliant Configuration", Proceedings of the 5th International Conference on Service Availability (ISAS 2008), (2008), 32 pages.

Kanso, A., et al., "Generating AMF Configurations from Software Vendor Constraints and User Requirements", 2009 International Conference on Availability, Reliability and Security (ARES 2009), (2009), 454-461.

Koch, Nora, et al., "Model Transformations from Requirements to Web System Design", ICWE '06: Proceedings of the 6th International Conference on Web Engineering, (2006), 281-288.

Li, Hui, et al., "Challenges in SLA Translation", SLA@SOI Technical Paper, (2009), 6 pages.

Narendra, N. C., et al., "Modeling Web Service Composition and Execution via a Requirements-Driven Approach", SAC '07: Proceedings of the 2007 ACM Symposium on Applied Computing, (2007), 1642-1648.

Salehi, P., et al., "A Model Driven Approach for AMF Configuration Generation", 6th Workshop on System Analysis and Modeling (SAM 2010), LNCS 6598, (2011), 124-143.

Salehi, P., et al., "A UML-Based Domain Specific Modeling Language for the Availability Management Framework", 2010 IEEE 12th International Symposium on High Assurance Systems Engineering (HASE 2010), (2010), 35-44.

Wu, Dan, et al., "Automating DAML-S Web Services Composition Using SHOP2", Proceedings of Second International Semantic Web Conference (ISWC 2003), LNCS 2870, (2003), 195-210.

Gherbi, A., et al., "A Tool Suite for the Generation and Validation of Configurations for Software Availability", *Automated Software Engineering, 2009; ASE '09; 24th IEEE/ACM International Conference on, IEEE*, Piscataway, NJ, Nov. 16, 2009, pp. 671-673.

Kanso, A., et al., "Generating AMF Configurations from Software Vendor Constraints and User Requirements", *Availability, Reliability and Security, 2009, ARES '09 International Conference On, IEEE*, Piscataway, NJ, USA, Mar. 16, 2009, pp. 454-461.

* cited by examiner

BRIDGING THE GAP BETWEEN HIGH LEVEL USER REQUIREMENTS AND AVAILABILITY MANAGEMENT FRAMEWORK CONFIGURATIONS

CROSS-REFERENCE TO RELATED APPLICATIONS

This application claims the benefit of U.S. Provisional Application No. 61/545,408, filed Oct. 10, 2011, which is hereby incorporated by reference.

TECHNICAL FIELD

Embodiments of the invention relate to the Availability Management Framework (AMF).

BACKGROUND

The high availability of critical services has become an important concern for many industries. The Service Availability Forum (SA Forum) (see, SA Forum, Overview SAI-Overview-B.05.03), which is a consortium of leading telecommunications and computing companies, has defined several standard interfaces to support the development of Highly Available (HA) systems. These standards aim at reducing the application development time and cost by shifting the availability management from applications to a dedicated middleware. Among those standards, the Application Interface Specification (AIS) supports the development of HA application by abstracting hardware and software resources. AIS defines the Availability Management Framework (AMF) (see, SA Forum, Application Interface Specification, Availability Management Framework SAI-AIS-AMF-B.04.01); a middleware service that manages the high availability of applications by coordinating their redundant components. In order to provide and protect the services, AMF requires a configuration that specifies the organization and the characteristics of the entities under its control.

AMF configurations are composed of logical entities representing services and software/hardware service provider resources. Each service imposes a specific workload on the service provider entities. AMF attains service availability by orchestrating the workload assignments among the redundant service provider entities.

Designing an AMF compliant configuration for a given application can be a tedious and error prone task due to the large number of attributes and numerous parameters to be taken into account. Researchers have developed an approach for the automatic generation of AMF configurations from a set of configuration requirements given by the configuration designer, and the description of the software defined by the software vendors (see, e.g., A. Kanso, M. Toeroe, A. Hamou-Lhadj, F. Khendek, "*Generating AMF Configurations from Software Vendor Constraints and User Requirements,*" Int. Conf. on Availability, Reliability and Security (ARES 2009). The approach succeeds in handling the complexity of the generation process, but it suffers from the low level of abstraction in the specification of configuration requirements (CR). The software is described in the Entity Types File (ETF) (see, SA Forum, Application Interface Specification, Software Management Framework SAI-AIS-SMF-A.01.02) in terms of entity prototypes, which characterize the deployment options and limitations of the different types of AMF logical entities implemented by the software. CR specify AMF services to be provided, the redundancy models to protect them, and the deployment infrastructure. However, configuration requirements are far from the formulation of the requirements that customers are accustomed to.

Some researchers have expressed application/user requirements as logical queries with logical operators, same for the requirements met by COTS components (see, e.g., L. Chung, W. Ma, K. Cooper, "*Requirements Elicitation through Model-Driven Evaluation of Software Components,*" pp. 187-196, Fifth International IEEE Conference on Commercial-off-the-Shelf (COTS)-Based Software Systems (ICCBSS'06), 2006). The application requirements are decomposed into a tree like structure and the resulting sub-queries are compared and matched with component requirements for ranking and selection. Search techniques such as simple key word based searching can be used. However, logical composition of key words generally cannot handle complete and complex user requirements.

In the field of Service-Oriented Architecture (SOA), Service Level Agreements (SLA) formally specify the conditions under which services need to be delivered. In this domain a research stream targets the analysis of the impact of SLA contracts (characterized by functional and non-functional descriptions) for web services on the infrastructure to be used for the provisioning of the services. Researchers have been investigating solutions for the mapping of SLA requirements into the layers of the SOA (see, e.g., T. Erl, *Service-oriented architecture: concepts, technology, and design*. 2005: Prentice Hall PTR Upper Saddle River, N.J., USA). However, SLAs are typically specified at the top-level of the infrastructure and no mechanism allows for the service providers to manage the underneath levels. Therefore, one of the most challenging research streams in the field of SOA is the investigation of SLA translation mechanisms.

SUMMARY

A computer-implemented method, system and computer product generate configuration requirements for an Availability Management Framework (AMF) configuration from user requirements. The user requirements specify a subset of properties of the AMF configuration. According to one aspect of embodiments of the invention, the method comprises the step of mapping the user requirements into entity prototypes defined in an extended Entity Types File (ETF) model. The extended ETF model models resources provided by software vendors and the properties of the resources. The method also comprises the step of identifying, at different levels of granularity in the extended ETF model, additional entity prototypes and dependency thereof that support functionalities of the mapped entity prototypes under a set of grouping conditions. The method further comprises the step of calculating the required number of component service instances (CSIs) and service instances (SIs) that satisfy the user requirements. The CSIs and SIs are entities corresponding to the mapped entity prototypes and the identified additional entity prototypes, respectively, and the CSIs and SIs represent workload at different levels of granularity in an AMF configuration. The calculation is based on the subset of the properties specified by the user requirements and measurements associated with the entity prototypes in the extended ETF model. The method further comprises the step of forming configuration requirements including the required number of CSIs and SIs for generating the AMF configuration that satisfies the user requirements.

According to another aspect of embodiments of the invention, a computer system is adapted to generate configuration requirements for an AMF configuration from user requirement. The user requirements specify a subset of properties of the AMF configuration. The computer system comprises a memory and a processor. The memory stores an extended ETF model that models resources provided by software vendors and the properties of the resources. The processor is adapted to perform the operations of mapping, identifying, calculating and forming as described above.

According to yet another aspect of embodiments of the invention, a non-transitory computer readable storage medium has stored therein instructions that, when executed by a computer system, cause the computer system to perform a method of generating configuration requirements for an AMF configuration from user requirements. The user requirements specify a subset of properties of the AMF configuration. The method comprises the steps of mapping, identifying, calculating and forming as described above.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
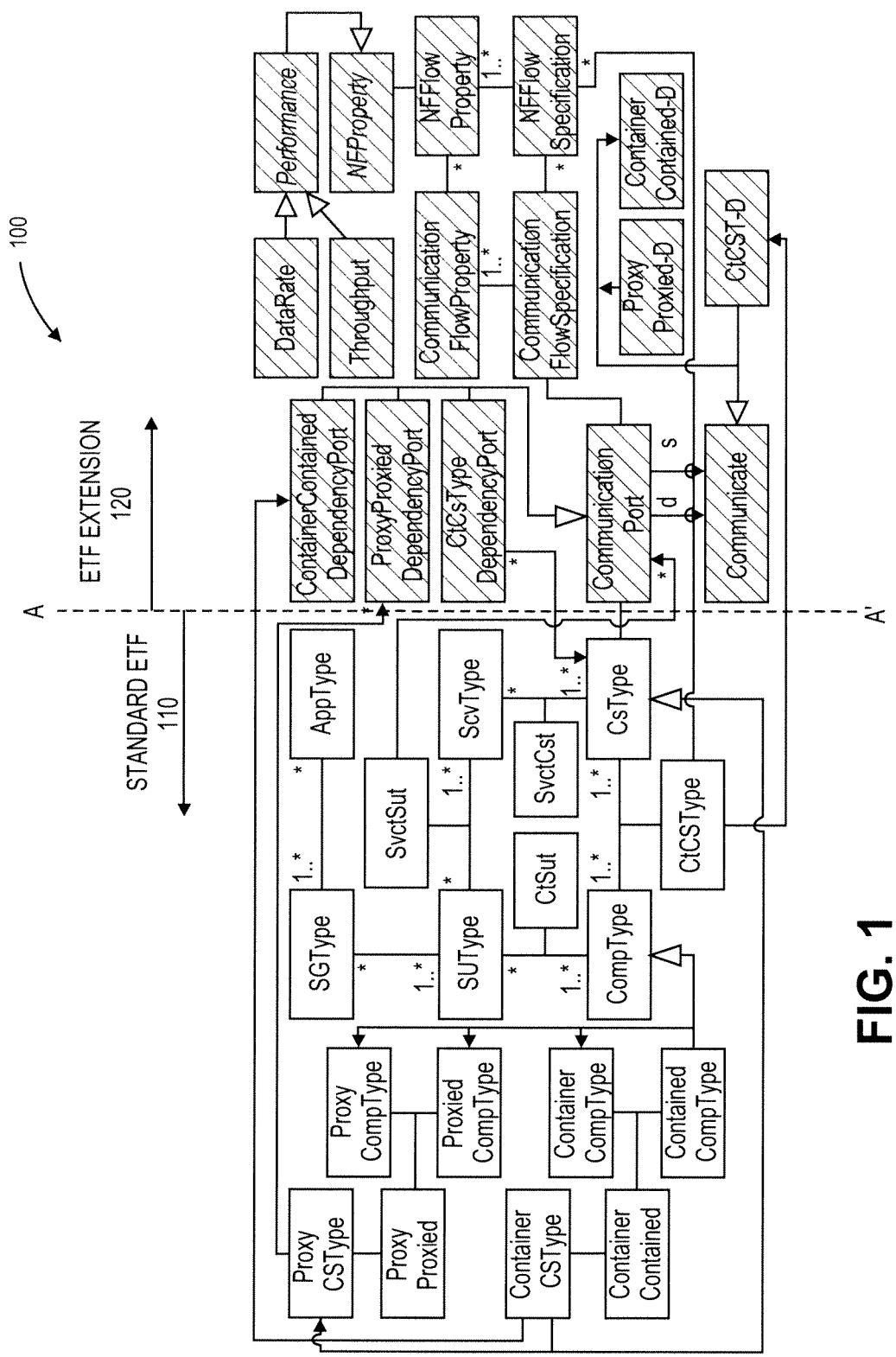
FIG. 1 illustrates an example of an extended ETF meta-model according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The Service Availability Forum supports the realization of Highly Available (HA) systems by means of standards like the Availability Management Framework (AMF), a middleware service that manages the high availability of services provided by applications by coordinating their redundant components. AMF system configurations capable of providing and protecting application services can be generated from the software description and from a set of configuration requirements (CR) given in terms of services, the redundancy model and the target cluster information. This formulation of requirements requires a deep knowledge of the AMF specification. Customers may not have such knowledge and are usually interested in specifying high level functional and non-functional characteristics of services in interest. Embodiments of the invention provide an approach for using higher level requirements for the generation of AMF configurations, and their transformation into configuration requirements.

Embodiments of the invention use high level user requirements (UR) as a new starting point for generating AMF configurations. Starting from the UR, the approach derives CR, which can be used with selected ETF prototypes to generate the AMF configurations that satisfy the UR.

The approach and the main concepts of the involved domains are illustrated in the following description with a running example: the configuration of a web based application server using a pre-defined software bundle. The UR specify the expectations of the customer with respect to the deployment of a web application. The goal is the definition of the CR and the identification of the proper elements of the software bundle to use for generating AMF configurations that satisfy the UR. It is worth noting that for readability reasons, the following presents a simplified description of the software bundle. It consists of a web server (e.g., Apache HTTP Server), an interpreter for PHP scripting language (e.g., PHP5), and a Database Management System (DBMS) (e.g., MySQL).

Before describing embodiments of the invention, it is useful to explain some concepts of the AMF configuration that are used throughout the rest of the description. These concepts include: the Entity Types File (ETF) and its extension, and the configuration requirements (CR).

The Entity Types File (ETF).

Vendors specify the intrinsic characteristics, capabilities and limitations of their software with respect to AMF using standard Entity Types File (ETF) in terms of entity prototypes (see, SA Forum, Application Interface Specification. Software Management Framework SAI-AIS-SMF-A.01.02).

The basic entity prototypes are called Component Type (CompType) and Component Service Type (CSType). ETF CompTypes define the characteristics of the components derived from the SW bundle and CSTypes specify the characteristics of the workload of the services that can be provided by these components. Additional entity prototypes may be optionally used to specify how these basic elements can be combined to achieve higher level functionalities. More specifically, ETF CompTypes may be combined into ETF SUTypes, while ETF CSTypes may be combined into ETF Service Types (SvcTypes). ETF Service Group Types (SGTypes) group a set of SUTypes and model availability related features, such as the redundancy models, applicable to the instances of these SGTypes. Finally, an ETF Application Type (AppType) aggregates one or many ETF SGTypes.

FIG. 1 illustrates a Unified Modeling Language (UML) class diagram that provides a partial view of an example of an extended ETF meta-model 100. The extended ETF meta-model 100 is built based on the standard ETF Extensible Markup Language (XML) schema. The ETF descriptions in the extended ETF meta-model 100 also involve the relationships between the service provider and service entity prototypes. More specifically, in FIG. 1, the CtCSType and SvctSut association classes model the relation between CompType and CSType, and between SUType and SvcType, respectively. Each of the CompType, CSType, SUType, SGType, SvcType and AppType is referred to as an entity prototype. The extended ETF meta-model 100 includes two parts: a standard ETF 110 and an ETF extension 120. The ETF extension 120 is to the right side of the dotted line A-A' in the extended ETF meta-model 100.

The proposed approach considers the non-functional (NF) characteristics of a given software bundle. The non-functional (NF) characteristics are defined as a subset of measurable properties of an AMF configuration; e.g., the CSTypes. Examples of the NF characteristics include, but are not limited to, performance measurements, interaction measurements, costs, and other measurements; e.g., processing speed, throughput, data rates, latency, etc. Such NF characteristics are part of the ETF extension 120 and are not included in the standard ETF 110.

The ETF extension 120, as shown in FIG. 1, concerns the specification of the interaction capabilities of a CompType in providing a CSType. The interaction occurs when service provider entities in providing their services communicate among each other by exchanging data.

The functional aspects of the interaction are modeled by several classes. The CommunicationPort class models the interface through which CompTypes interact. The CommunicationPort complements the description of the CSType by specifying the flow of data received or sent as part of the service provisioning. The CommunicationFlowProperty models the structural properties of each single data item of the flow. The CommunicationFlowSpecification aggregates the CommunicationFlowProperties into a flow associated with a CommunicationPort.

Other classes model the NF characteristics of the data flow. The NFProperty abstract class has been introduced to model generic NF characteristic. The Throughput and DataRate classes are two concrete extensions of the NFProperty within the Performance category. These specify respectively the throughput of a continuous flow and the rate at which data items are routed in a discrete (i.e. not continuous) flow. Additional NF properties (potentially belonging to other NF categories) can be introduced by extending the NFProperty. The NFFlowProperty class combines a set of data items describing NF properties into a CommunicationFlowProperty. The NFFlow-Specification aggregates multiple NFFlowProperties to characterize the NF aspects of a flow (modeled using class CommunicationFlowSpecification).

The NF characteristics of a flow depend on both the service and the service provider entities. Therefore, NFFlowSpecification is linked to the association class CtCSType. The association Communicate models the connection that can be defined between two CommunicationPorts. A connection is defined when the involved ports are conjugated and the NF specification of their flows is compatible. Different Communicate associations define different compatibility constraints.

For example, it is assumed that the output throughput of the source port cannot be divided among multiple destination ports. Therefore, the NF compatibility condition is verified when the input throughput of the destination port is greater or equal to the output throughput of the source port. However, property DataRate is not affected by this constraint. In fact, in case the destination port is not capable of supporting the volume of data generated by the source port, at AMF configuration generation time one could split the flow among a sufficient number of entities generated from the entity prototypes that host the destination port.

Figure 2:
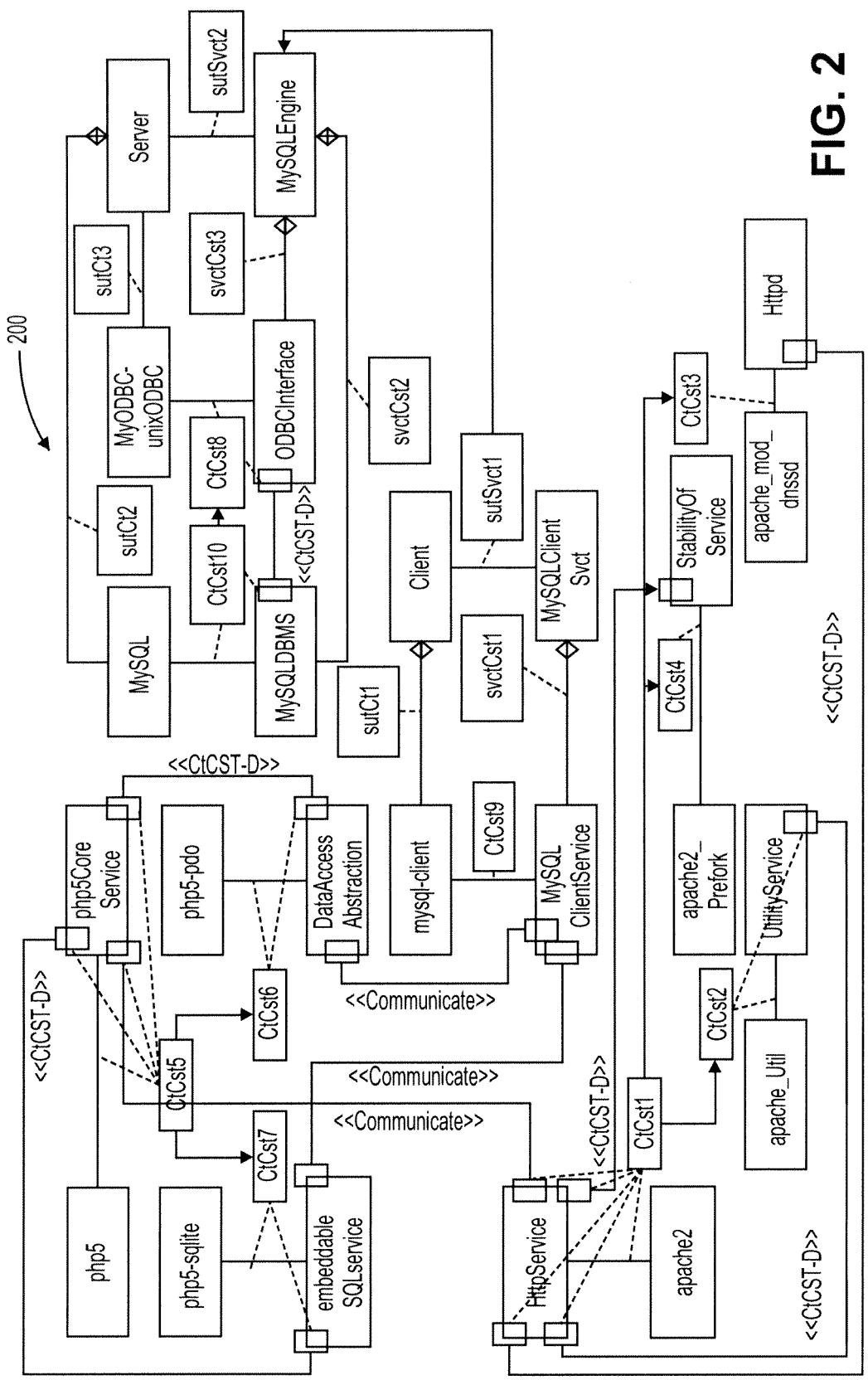
FIG. 2 illustrates an example of an instance of the extended ETF meta-model of FIG. 1.

FIG. 2 illustrates an example of an instance of the extended ETF meta-model 100, which is referred to as an extended ETF model 200. According to the extended ETF model 200, the web server module includes CompTypes apache2, apache2_Prefork, apache_Util, and apache_Mod_dnssd, which support CSTypes HttpService, StabilityOfService, UtilityService, and Httpd, respectively.

The extended ETF model 200 shown in FIG. 2 represents the use of the Communicate association. For instance, CompType php5 in providing CSType php5CoreService can communicate with the pair of CompType/CSType apache2/HttpService. Other Communicate relations are defined between the pairs php5-sqlite/embeddableSQLservice and mysql-client/MySQLClientService, and between php5-pdo/DataAccess-Abstraction and mysql-client/MySQLClient-Service. For readability the communication ports are represented as anonymous UML Ports in FIG. 2, and the specification of their flows is not shown.

Referring again to FIG. 1, for the entities involved in a dependency relation, the particular interaction scenarios need to be verified. Based on the category of the involved CompTypes, the ETF meta-model 100 specifies three different dependency relations that are denoted as CtCSType, ProxyProxied and ContainerContained. The semantics of these dependencies follow the specifications. Each dependency involves entity prototypes that are represented by classes which either correspond or extend the CompType and the CSType classes. The dependencies themselves are modeled by classes that represent ports, flows and connections. The ports, namely CtCSTypeDependencyPort, ProxyProxiedDependencyPort, ContainerContainedDepen-dencyPort, are defined as extensions of CommunicationPort class. The structural and NF aspects of the dependency related data flow are modeled using the same classes and criteria that were introduced for the generic communication scenario. Finally, the connections are modeled by extensions of the Communicate association denoted as CtCST-D, ProxyProxied-D and ContainerContained-D (where -D indicates a dependency relationship). Two ports can be connected when they belong to the same category, and as for CommunicationPorts, when their flow specifications are compatible.

Examples of CtCSType dependencies are shown in the extended ETF model 200 of FIG. 2. In the figure again dependency ports are represented as anonymous UML ports. To identify explicitly the provider prototypes involved in the dependencies, each dependency port is connected with the association class CtCSType that specifies the involved CompTypes with a dashed line. For instance, in providing HttpService, apache2 depends on the provision of UtilityService by apache_Util, StabilityOfService by Apache2_Prefork, and Httpd by apache_mod_dnssd.

Another type of dependency is defined for the dependency of an SUType on a SvcType in providing a particular SvcType. For instance, Client in providing mySQLClientSvct requires MySQLEngine being provided. Although this dependency type involves SUTypes and SvcTypes the interaction is carried out at the component level. Therefore, there is no need to introduce a dedicated interaction port for this dependency. The dependency requires that at least one of the ports that are defined for the CSTypes at the interface of the sponsor SvcType can be connected with at least one of the port of the CSTypes at the interface of the dependent Svc- Type. An example that shows this type of dependency as the aggregation of dependencies at CompType level will be described below.

The AMF Configuration Requirements (CR).

The AMF CR specify the characteristics of the services to be provided by an application to be configured. AMF requires a configuration that specifies the organization of the logical entities that compose the applications under its control. An AMF configuration consists of AMF entities and AMF entity types. AMF entity types define the characteristics shared by multiple AMF entities. AMF entities are logical entities representing services and software/hardware service provider's resources. The basic entities are called Components and represent resources capable of supporting the workload imposed by functionalities of the application's services. This workload is referred to as Component Service Instance (CSI). Components are aggregated into Service Units (SU), logical entities representing the basic redundancy unit for AMF. The workloads of the components contained in an SU are aggregated into a Service Instance (SI), which represents the workload assigned to the SU. SUs are further grouped into Service Groups (SG) to protect a set of the provided SIs according to a redundancy model (i.e. No-Redundancy, 2N, N+M, N-Way, or N-Way-Active). Finally, AMF applications combine one or more SGs. Each SU is deployed on an AMF node and the set of all AMF nodes forms the AMF cluster.

CR specify several properties of the AMF configuration. These requirements express properties of the services, such as their types, the required number of instances of service entities, the relationships between these elements, and the redundancy models to protect them. The CR are described as a set of templates, each of which is shorthand to specify multiple similar instances of service entities. More specifically, the CSI Template specifies the required CSType as well as the expected number of CSIs of that type within an SI. The SI Template specifies the SIs with the associated SvcType, the required redundancy model to protect them, and the associated CSI Templates.

Figure 3:
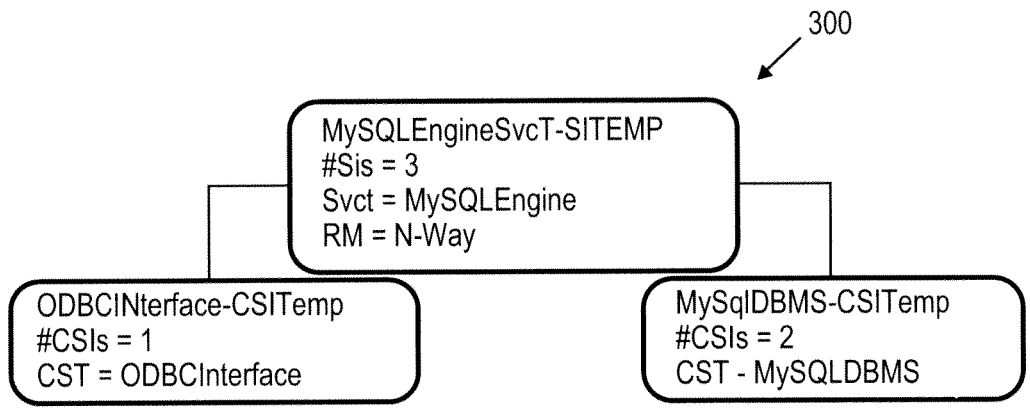
FIG. 3 illustrates an example of a configuration requirement model.

For instance, FIG. 3 shows part of a Configuration Requirement model 300, which partially defines the DBMS services to be provided by software. MySQLEngineSvcT-SITemp represents the SI Template defined for the service MySQLEngine. MySQLEngineSvcT-SITemp defines the number of SIs of this service as 3, to be protected by an SG using the N-Way redundancy model. In addition, it aggregates the CSI Templates ODBCInterface-CSITemp and MySqlDBMS-CSITemp, which define the characteristics of the CSIs to be grouped in each SI. More specifically, ODBCInterface-CSITemp requires one CSI of type ODBCInterface in each SI one of type MySQLEngine. Similarly, MySqlDBMS-CSITemp requires 2 CSIs of the type MySQLDBMS aggregated in each SI.

Embodiments of the invention generate AMF Configuration Requirements from user requirements. The design of an AMF configuration for a given application is a complex task because it involves a large number of entities, properties and constraints.

Users/Customers are generally interested in the overall functionality of the applications' services as well as the non-functional characteristics under which these services should be provided and protected. The expectations are denoted as UR since they are expressed from the services' users/consumers perspective. UR do not cover any aspect of the infrastructure that will be used to provide and protect the required services. For instance, considering an example, the customer may be interested in deploying a web application capable of supporting a volume of 1000 requests per second.

Embodiments of the invention provide an approach that considers UR including NF properties such as performance and interaction capabilities, as a new starting point to generate AMF configurations. The approach analyzes the UR alongside the functional and non-functional description of the software bundle as defined by the extended ETF meta-model, in order to derive the CR for the generation of the AMF configurations. The proposed approach derives the CR that constrain the characteristics of service entities and enables the identification of service provider entity prototypes that will be used during the configuration generation, which used to be one of the first steps in configuration generation.

Figure 4:
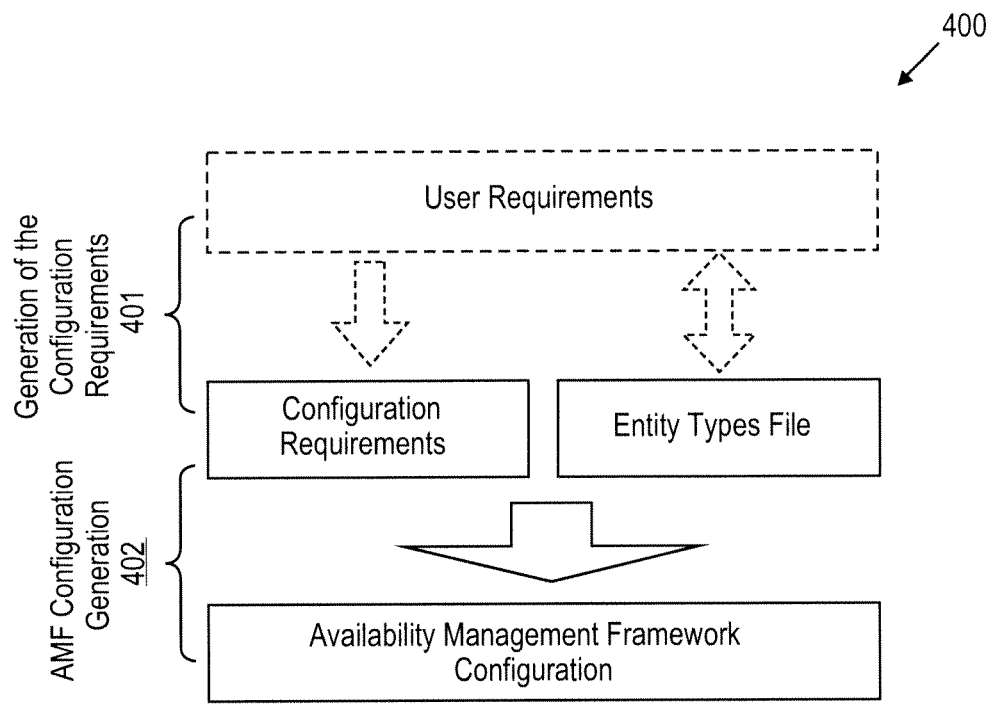
FIG. 4 illustrates an AMF configuration generation from high level user requirements according to one embodiment of the invention.

Embodiments of the invention help bridging the gap between the domain of UR and the AMF configurations. Based on the proposed extension, an entire configuration generation process 400 is articulated into two phases, as shown in FIG. 4. A first phase 401 considers the transition from UR to CR and selected ETF entity prototypes, while a second phase 402 focuses on the passage from CR and ETF to AMF configurations. The first phase 401 is based on the functional and non-functional constraint of the UR and the extended ETF, and the second phase 402 focuses on the AMF constraints. Techniques for processing the second phase 402 are known in the field and will not be described herein.

Embodiments of the invention guide an analyst from the analysis, specification and decomposition of URs, to the identification of the software entities capable of satisfying these requirements. The analysis criteria are based on dependency and interaction capabilities of the software entities. The required capabilities specified by the UR are compared to actual capabilities of the software implementation with the aim to identify the entity prototypes and to estimate how many instances of software entities should be specified in the CR. Finally, once completed the analysis, CR are generated considering all the required properties.

In the following, a ten-phase process is described based on the extended ETF meta-model 100 of FIG. 1 and the extended ETF model 200 of FIG. 2. It is understood that different extended ETF meta-models and models that extend the standard ETF meta-model and model (as defined in the AMF specification mentioned above) to include measurable properties of entity prototypes can also be used in the ten-phase process described herein.

Phase 1: User Requirements Specification and Decomposition.

As previously mentioned, in one scenario, the customer is interested in deploying a HA web application that can handle 1000 requests per second. This scenario is to be used as the running example in the following description of the ten-phase process. This request is too generic to be used for any selection. For this reason, in one embodiment, UR are refined and decomposed into more detailed descriptions.

Figure 5:
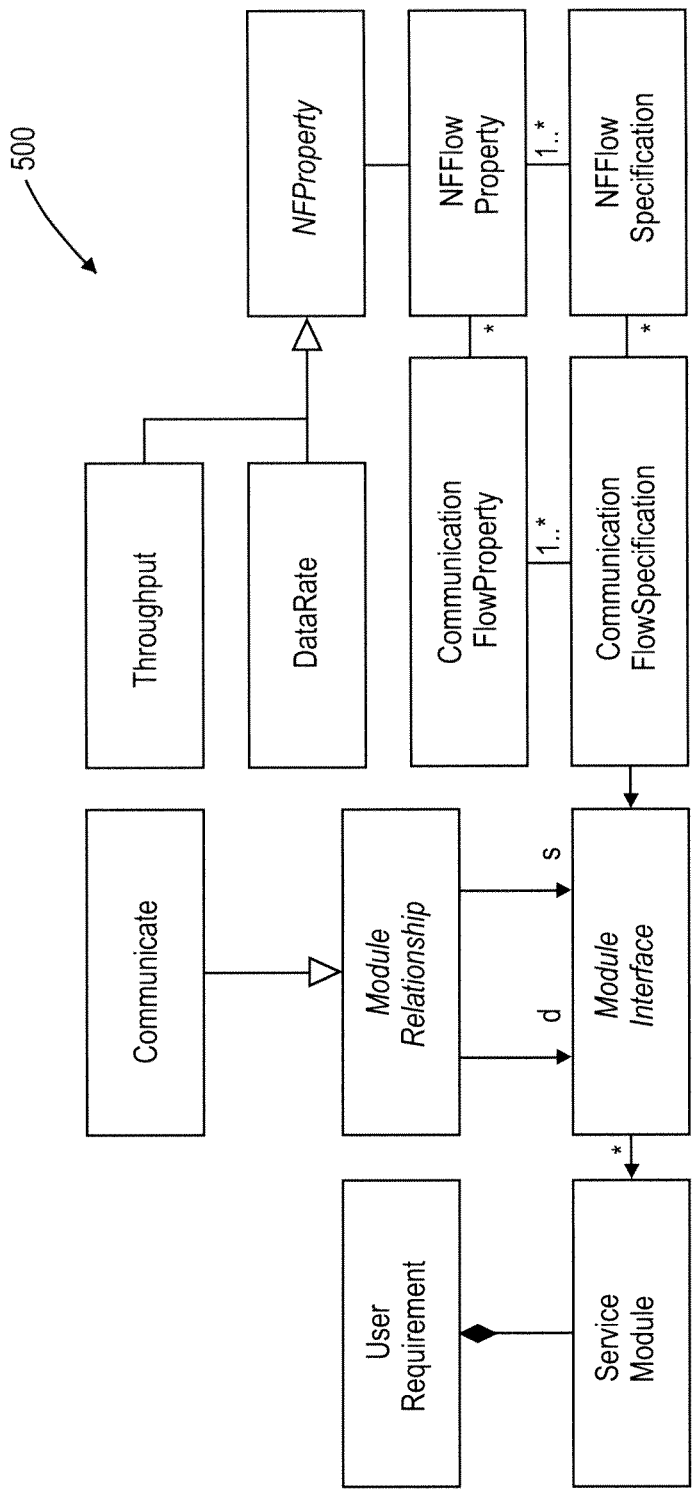
FIG. 5 illustrates a conceptual model of user requirements according to one embodiment of the invention.

FIG. 5 shows an example of a conceptual model 500 according to one embodiment of the invention. The conceptual model 500 introduces an example of the elements in the user requirements domain that can be used for generating AMF configuration requirements.

The class UserRequirement is used to define the high level UR specified by a customer. These requirements are informal textual descriptions embedded as internal attributes in the class UserRequirement.

In one embodiment, the decomposition is performed by a service configurator, an expert in the service domain, through the interaction with the customer. The role of the service configurator is to decompose the required functionality into a set of basic functionalities called "service module requirements" (modules for short) that are necessary for satisfying the UR. In one embodiment, these basic functionalities are directly or indirectly related to the NF characteristics specified by the UR. In one embodiment, the service configurator can be an automatic process performed by a computer system. Modules are modeled by the class Module the instances of which are identified during this decomposition. The class includes attributes that keep track of the module's name, role and functionality. In the running example of FIG. 6, the original UR named Web Application is decomposed into three different modules called HTTP Server, Interpreter, and DBMS. In an alternative embodiment, UR can be directly mapping to entity prototypes defined in the extended ETF model without first being decomposed into service modules.

The functionality of a module can be either directly invoked by a user or though the interaction with other modules. At least one module has to communicate with the user. With respect to this interface, the modules that receive data are the input modules, and those that generate data are the output modules. In the example, HTTPServer is an input/output module, as it plays both roles.

The class ModuleInterface models the module interface. The attributes of ModuleInterface specify the type and the role of the interface, i.e., if the interface is used to interact with the user or with other modules, and the direction of the flow of data that are exchanged during the interaction. For instance, in the running example, the interface ExtHttpServer models the interaction point of the HttpServer, with the user, and the FromToInterpreter represents the interface with the module Interpreter (see Layer (1) of FIG. 6).

Figure 6:
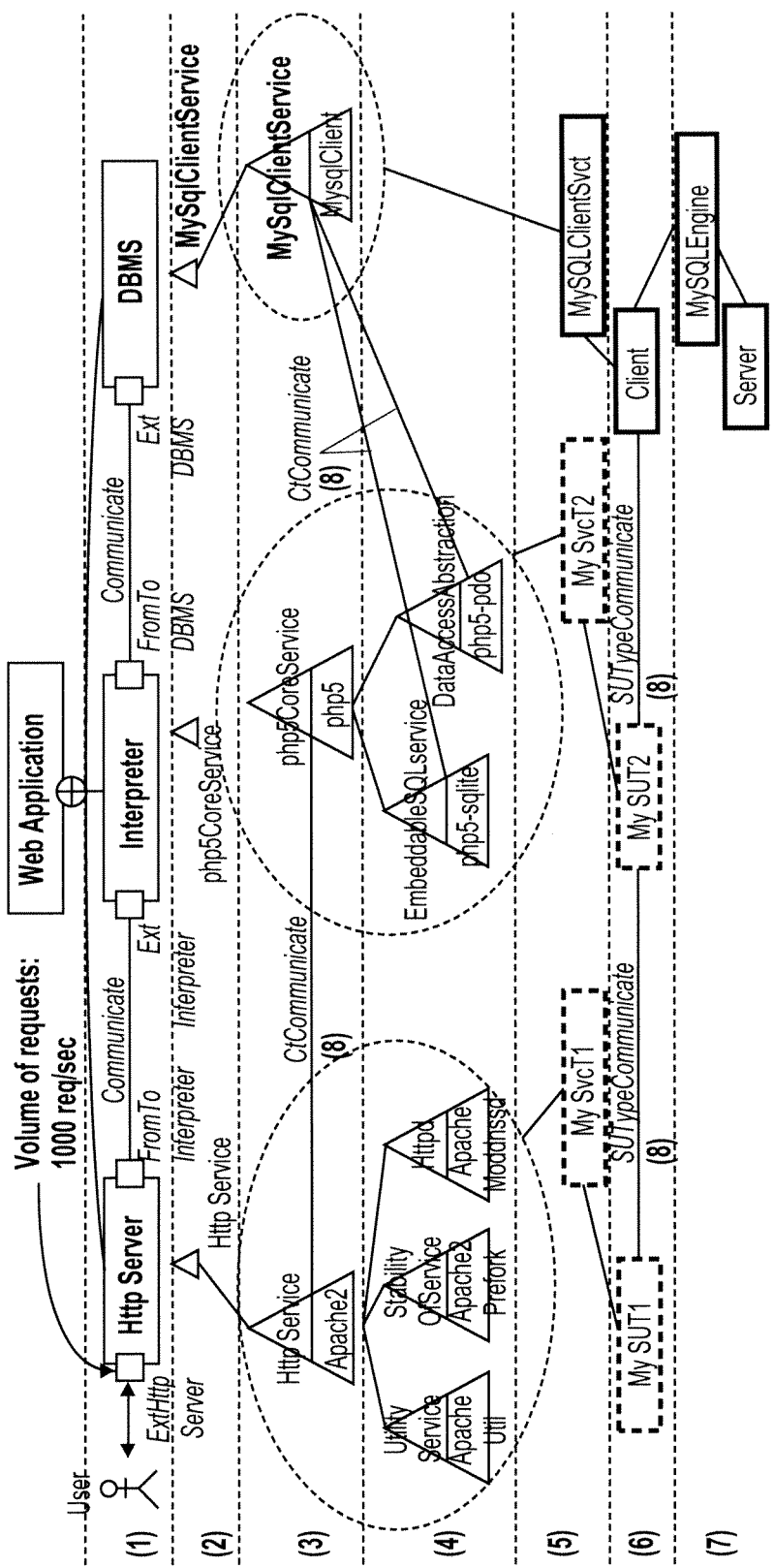
FIG. 6 illustrates an example of a process (phase 1 to phase 8) for generating configuration requirements according to one embodiment of the invention.

In one embodiment, the service configurator is also responsible for specifying the interactions between the modules. The association Communicate supports this need by linking the interfaces of the modules involved in an interaction. As shown in FIG. 6, in the running example the HTTP Server and the Interpreter modules interact through the interfaces FromToInterpreter and ExtInterpreter, while the Interpreter and the DBMS, through the FromToDBMS and ExtDBMS, respectively. The first association models the requests to interpret PHP scripts and the provided responses that are exchanged through the interfaces of the modules. The second association models the operations requests on the DB and the provided answers.

In one embodiment, the NF properties specified informally in the UR are mapped to the modules at the user interface. More specifically, the mapping is made at the level of the user interfaces of the interested modules. The modeling of NF properties is supported by the same classes that were described above in the ETF extension 120 of FIG. 1. In the running example, the expected volume of requests specified by the customer becomes a requirement for HTTP Server. The requirement is mapped to the interface ExtHttpServer and it is specified as a data flow associated with the interface using the DataRate class.

Phase 2: Identification of the Service Entity Prototypes Capable of Supporting the Functionalities Specified By The Service Module Requirement.

In this phase, the service entity prototypes of the extended ETF model are identified that are capable of supporting the module functionalities.

More specifically, a set of alternative ETF service entity prototypes are identified for each module obtained from phase 1. This is done at the lowest level of granularity of the extended ETF model, namely the CSTypes. Such a selection can be automated by further extending the extended ETF meta-model to provide not only the NF characteristics but also the description of the functionalities supported by the service entity prototypes. The study of such an extension is not covered here. The technology is expected to be similar to that used at service composition.

Layer (2) of FIG. 6 shows the identified CSTypes represented by empty triangles. For instance, for the module Interpreter, the selected CSType is php5CoreService. Note that a module may map into multiple alternative CSTypes.

Phase 3: Identification of the Service Provider Prototypes Capable of Providing the Services.

The service entity prototypes identified in Phase 2 can be provided by different service provider entity prototypes.

In this phase, the CompTypes capable of providing the CSTypes identified for each module are selected. The selection is automatic through the exhaustive search in the extended ETF model.

The selection can result in a set of alternative CompTypes for each CSType potentially indicating different NF characteristics. In the next phases, this preliminary selection is refined considering only those types that can satisfy the NF requirements of the module.

In Layer (3) of FIG. 6, each CSType identified by the service configurator is provided by different CompTypes. The gray part of the triangle represents the CSType (matching the empty triangle of Layer (2)), while the black part shows the CompType. For instance, CompType MysqlClient can be selected to support MySQLClientService and Apache2 to support HttpService.

Phase 4: Dependency Analysis at CompType Level.

The components and CSIs derived from the prototypes selected in Phase 2 and 3 may not be capable of supporting alone the functionality of each module. In this case, additional elements of other entity prototypes are required. The goal of this phase is the identification of these entity prototypes. The identification is achieved by means of the analysis of the dependency relationships of CompTypes.

Components can be from the Proxied category, thus requiring a Proxy that conveys the requests of the AMF. They can also be of the Contained category, requiring a Container capable of managing their life cycles. Moreover, based on CompType/CSType dependency, a CompType can depend on another CompType when providing specific CSTypes.

The selection of the required entity prototypes resulting from the different types of dependency relationships is achieved through the automatic analysis of the extended ETF model. More specifically, for each couple of CompTypes/CSTypes identified in previous phases, it is determined if:

(A) the CompType is Proxied or Contained. In this case the required Proxy or Container CompType and respectively the ProxyCSType or ContainerCSType that controls the Proxied or Contained component are selected.

(B) it is connected with another CompType/CSType, referred to as sponsor, through a CtCSType dependency. In this case, the sponsor entity prototypes are selected.

The above determination ((A) and (B)) is applied recursively to all the selected and added elements.

Layer (4) of FIG. 6 shows the result of the dependency analysis. The selected elements, represented as grey and black triangles, are connected through links that model the dependency relationships. For instance, the pair php5CoreService/php5 depends on embeddableSQLservice/php5-sqlite and DataAccessAbstraction/php5-pdo, while the pair MySQLClientService/Mysqlclient does not depend on other elements.

Phase 5: Identification of the Service Types.

The pairs of CompType/CSType identified in Phase 3 are at the head of the graphs composed of a set of interdependent CompTypes/CSTypes. The CSTypes contained in these structures must be grouped into SvcTypes. The goals of this phase are: 1) the identification of the required characteristics of SvcTypes starting from the CSTypes' grouping criteria, 2) the analysis of the extended ETF model searching these Svc-Types, and 3) the creation of the required SvcType, if no applicable type is defined in the extended ETF model.

The aggregation criteria consider the type of dependency relationships and the constraints related to the service provider entities capable of providing the services. For example, all the CompTypes connected through a CtCSType dependency must be aggregated into the same SUType and the CSTypes into the same SvcType. Thus, a unique SvcType is required to group the CSTypes identified for the HTTP Server module. In fact all the pairs of CompTypes/CSTypes selected for this module are connected through CtCSType dependencies. The aggregation criteria also indicate when separate grouping is required.

Once the grouping conditions for the different groups of CSTypes are identified, it is necessary to examine the extended ETF model in order to find the SvcTypes that satisfy these requirements. In the case where at least one SvcType is defined in the extended ETF, this/these SvcType(s) will be selected. Otherwise, a new SvcType will be defined in order to satisfy the grouping requirements.

In the extended ETF model 200 of FIG. 2, SvcType MySql-ClientSvct aggregates one CSType, called MySqlClientService, which was selected for the DBMS module. Therefore, MySqlClientSvct is the proper ScvType for this module. Since no SvcType in the extended ETF model 200 groups the CSTypes selected for the HTTP Server and the Interpreter modules, two SvcTypes have been defined. MySvcT1 has been generated to aggregate HttpService, UtilityService, StabilityService, and Httpd CSTypes. MySvcT2 has been defined to group phpCoreService, embeddableSQLservice and DataAccess Abstraction.

Layer (5) of FIG. 6 shows the selected SvcTypes. The generated types are represented as dashed gray rectangles, while the types identified in the extended ETF model, as solid gray rectangles.

Phase 6: Identification of the SU Types.

Similar to Phase 3, this phase aims at selecting the service provider entity prototypes capable of supporting the selected service entity prototypes. However, the focus here is on the SUTypes capable of providing the SvcTypes identified in Phase 5.

First, for each SvcType it is necessary to determine whether the extended ETF model contains an SUType capable of providing it. This SUType should aggregate all the CompTypes whose CSTypes were considered for the selection of the SvcType. For instance, considering the DBMS service module in the running example, the analysis aims at identifying an SUType which provides MySqlClientSvct and contains MySqlClientComp. As shown in FIG. 2, the Client SUType satisfies both requirements, and therefore is selected.

It is worth noting that one or multiple SUTypes can be identified for each SvcType. All the resulting type(s) must be selected. Each alternative SUType may be used to generate a different set of CR.

In the case where the considered SvcType is created, there will not be a proper SUType in the extended ETF model. Consequently, it will be necessary to define one. In the above example, the MySvcT1 and MySvcT2 SvcTypes have been created and MySUT1 and MySUT2 have been therefore defined to support them accordingly.

Layer (6) of FIG. 6 shows the selected SUTypes. The Client SUType contained in the extended ETF model is represented using solid black rectangles, while the created SUTypes are illustrated with empty dashed rectangles.

Phase 7: Dependency Analysis at the SUType Level.

The extended ETF model specifies whether a given SUType requires another SvcType for providing a certain SvcType. Based on the dependency the SUs of the involved SUTypes are capable of interacting with each other, meaning that some of the aggregated components of the SUs can interact with each other.

This dependency requires the interfaces of the involved SUTypes/SvcTypes to be compatible. For instance, let us suppose that SUType SUT-A depends on SUT-B/SvcT-B for providing the SvcT-A SvcType. The dependency requires the grouped pairs of CompTypes/CSTypes to be capable of interacting. This occurs when 1) the type of the data issued by the sender CompType/CSType, is compatible with the type of the data required by the receiver pair, and 2) the flow of data generated by the sender can be handled by the receiver (e.g., if throughput and/or data rate are compatible).

It is worth mentioning that CtCSType dependency is not considered here since this relationship is defined exclusively within the components of the same SU and not among the components of different SUs.

In the case of dependency, the interface of at least one pair of CompType/CSType grouped by the dependent SUType, SUT-A, should be compatible with at least one CompType/CSType of the supplier SUType, SUT-B. The interface of the SUType/SvcType aggregates the interfaces of the contained compatible CompTypes/CSTypes.

The analysis of SI dependencies may lead to the definition of chains of dependent elements. Each SUType, when providing a SvcType, may require one (or even multiple) SvcType(s) to be provided. Moreover, the SvcType at the end of each dependency relation may be provided by different SUTypes. These elements can also be affected by additional dependencies, recursively.

The analysis is applied to all the SUTypes identified in Phase 6 and recursively applied to the identified dependent SUTypes until identifying the entity prototypes that do not require other SvcTypes in order to support their SvcTypes. In the running example, the SUType Client requires MySQLEngine in order to provide MySQLClientSvct. The SUType Server is capable of providing MySQLEngine and Server is, therefore, selected. Since the SUTypes were generated, no dependency is defined for the SUTypes of the HTTP Server and Interpreter modules.

The result of the analysis for the running example is shown in Layer (7) of FIG. 6, Dependencies are represented using lines that connect the selected service and service provider entity prototypes.

Phase 8: Identification of Interaction Scenarios Between Service Provider Entity Prototypes Belonging to Different Modules.

In this phase the selected entity prototypes are refined based on the communication relationships defined among the modules of phase 1. These relationships require the service provider entity prototypes selected for one module to interact with the entity prototypes of the associated one.

The interaction capabilities of the entity prototypes guide the selection of the proper elements to be used for each module. The analysis considers one relationship at a time. For instance, consider the scenario shown in the example of FIG. 7 where UR has been decomposed into two modules, called M1 and M2. M1 is interfaced with the user and requires communicating with M2. The entity prototypes selected for the modules are organized into alternative sets.

The analysis considers any possible combination of sets of the two modules. The process starts focusing on the first set of the entity prototypes of M1 and M2, namely, the collections denoted M1S1, M2S1. Different evaluation criteria are applied for 1) the case where all the entity prototypes in the sets exist in the extended ETF model and 2) the case where at least one of selected prototypes has been generated in phases 5 and 6 of the approach.

Figure 7:
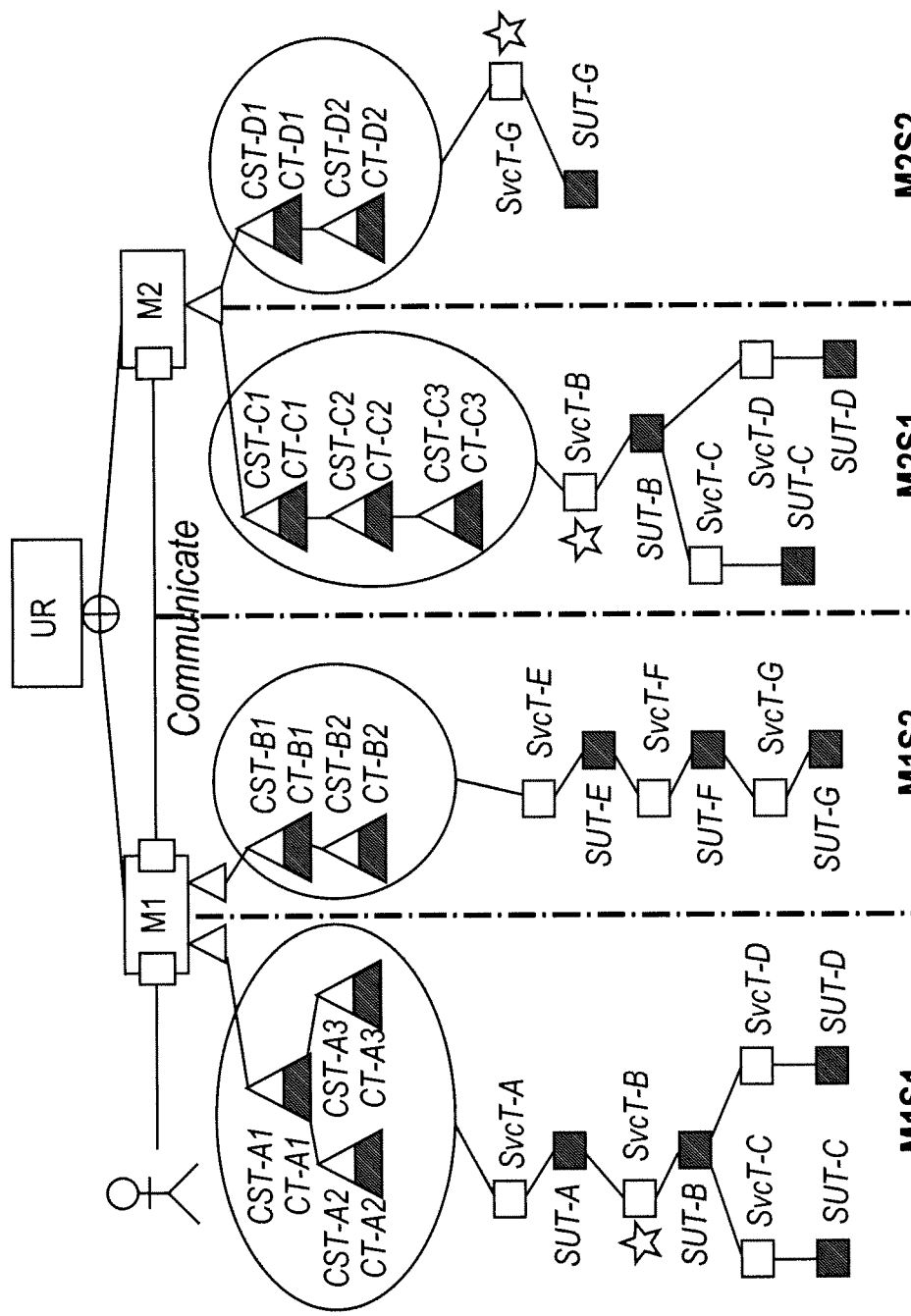
FIG. 7 illustrates an example of an interaction analysis according to one embodiment of the invention.

In the first case, the considered sets convey a valid interaction scenario if the entity prototypes of the input module include the SvcType at the head of the dependency chain of M2 (SvcT-B). As shown in FIG. 7, this case has been verified since SvcT-B is in M1S1 (the corresponding elements are marked with a star). The interaction has been captured by the dependency specified in the extended ETF model between the elements SUT-A/SvcT-A and SvcT-B. It is worth noting that, in case where the correspondence is verified, the elements that follow the corresponding ones are the same for both modules since they have been selected from the same ETF model. Such as in case of the dependency of the MySQLClientSvct on the MySQLEngine identified in phase 7.

In the second case, the considered sets include generated entity prototypes. In this case, the interaction requirements can be achieved if both the considered sets include at least one CompType/CSType pair capable of interacting with a pair belonging to the other set.

This condition is satisfied in the running example by the entity prototypes selected for the Http Server and Interpreter modules. Both modules consist of one set of entity prototypes and the selected SvcTypes and SUTypes of both sets have been created (i.e., MySvcT1, MySvcT2, MySUT1 and MySUT2). Therefore, the analysis focuses on the pairs of CompTypes/CSTypes. Due to the fact that in the extended ETF model of FIG. 2 Apache2/HttpService can interact with Php5/php5Core-Service, these pairs satisfy the interaction requirements specified between HTTP Server and Interpreter modules. As a consequence, the involved entity prototype set is selected as part of a valid candidate scenario.

Once the first pair of sets of entity prototypes has been evaluated (M1S1-M2S1, in FIG. 7), the analysis shifts to another pair (e.g. M1S1-M2S2). The process is repeated, considering any possible combination of sets. Each scenario including sets of entity prototypes that satisfy the interaction requirements is selected. In the example of FIG. 7, the only admissible scenario is composed of the entity prototypes in M1S1-M2S1 and M1S2-M2S2. It is worth noting that, as shown in FIG. 6, the corresponding SvcType can be identified at different levels of the chain of elements. The elements between the head of the chain and the retrieved one (e.g., SvcT-F/SUT-F) support functionalities that have not been identified in the decomposition phase by the service configurator.

The analysis process is reapplied to each dependency interaction defined among the modules. Each application refines the set of entity prototypes, preserving only the ones that satisfy the UR.

In the running example, once the process has considered the interaction between the Http Server and Interpreter modules, the process considers the interaction requirements imposed between Interpreter and DBMS modules. Both modules consist of only one set of entity prototypes.

The SvcType and SUType of Interpreter were created. Based on the extended ETF of FIG. 2, the interaction requirement is achievable through the communication relationship between mysqlClient/MySql-ClientService and both php5-sqlite/embeddableSqlService and mysqlClient/MySql-Client Service. Consequently, the sets of these types have been selected.

The process may results in multiple scenarios, each of which is a combination of the set of entity prototypes that have been selected in each module.

FIG. 6 illustrates the result of the interaction analysis between the selected entity prototypes that satisfy the interaction requirements. Connectors that link the selected entity prototypes are marked with (8).

Phase 9: Calculation of the Required Number of CSIs of Each Selected CSType.

After analyzing properties of the UR and of the extended ETF model, and selecting the proper entity prototypes capable of satisfying these requirements, the following phase consists of calculating the required number of CSI of each selected CSType. The calculation considers each pair of CompTypes/CSTypes selected in each scenario identified in Phase 8. For every CompType/CSType pair in the chain of dependent entities identified in each scenario, the required number of CSIs to be generated can be calculated. The calculation is based on the analysis of the NF properties of the CompTypes in providing the CSTypes that is specified as the NFFlowSpecification of the CSType's CommunicationPort, as well as the NF aspects of the module interfaces.

Given an interaction scenario, the analysis starts considering the entity prototypes selected for the input module. More specifically, the analysis starts considering the CompType that supports the CSType selected in phase 2, which is at the head of the chain of dependent elements. In the running example it is CompType Apache2.

The NF properties concerning the input communication features of the CompType in providing the selected CSType, which have been specified in terms of the flow of the CSTypes's CommunicationPort, are compared with the respective properties of the input module's user interface. The comparison aims at identifying the minimum number of CSIs of that CSType that can satisfy the requirements. For example, the calculation described in (1) focuses on property DataRate.

Equation (1) estimates the minimum number of CSIs of type CSType that are required to handle the flow of data at a specific rate.

$$\#CSIs_{CSYType} = \left\lceil \frac{DataRate_{Module}}{DataRate_{CompType/CSType}} \right\rceil \quad (1)$$

It is worth mentioning that the target of estimation is the set of positive integers, therefore in (1) and in the rest of this section real values resulting from the calculations are approximated to the ceil (the smallest following integer). In the running example, equation (1) is used to derive the minimum number of CSIs of the type HttpService that are required to support the volume of requests specified by the customer. As previously mentioned, the input module should handle 1000 req/s.

Table I, which has been derived from the extended ETF model of the running example, shows the input and output data rates of the selected CompTypes when providing a given CSType. As shown in Table I, the pair Apache2/HttpService is capable of supporting a volume of 250 u/s as input (from the user) generating a data rate of 200 u/s. Therefore, according to equation (1) the required number of CSIs of type HttpService is 4.

TABLE I

Characterization of CompTypes in providing CSTypes, with respect to the Data Rate property.

| NFFlowSpecification associated with a CompType/CSType | Input data rate unit/second | Output data rate unit/second |
|---|---|---|
| Apache2/HttpService | 250 | 200 |
| ApacheUtil/UtilityService | 100 | 80 |
| Apache2Prefork/StabilityOfService | 200 | 150 |
| ApacheModdnssd/Httpd | 200 | 190 |
| Php5/php5CoreService | 50 | 40 |
| Php5Sqlite/embeddableSqlService | 50 | 50 |
| Php5pdoDataAccessAbstraction | 50 | 50 |
| MysqlClient/MySqlClientService | 200 | 300 |
| MySql/MySqlDBMS | 1000 | 1000 |
| MyODBC-UnixODBC/ODBCInterface | 1000 | 1000 |

Based on the assumed service restriction that the output throughput cannot be divided among multiple target ports, the calculation required for the Throughput property is straightforward. One CSI is always required unless the value of property throughput of the selected prototype's data flow is less than the one of the module. In this case, the considered prototype is not appropriate and the scenario is discarded. In other words, either there is a single CSI or the selected CSType should not be included in the CR. A similar constraint is used in the next steps of the calculation as well. Due to this criterion the calculation based on throughput is straightforward and thus, the rest of description will analyze only the calculation which is based on DataRate property.

The process continues by focusing on the CtCSType dependencies of the recently considered CompType/CSType pairs. For instance, Apache2, in providing HttpService, depends on the provisioning of UtilityService by ApacheUtil.

TABLE II

Characterization of CtCSTypes dependencies with respect to the Data Rate property

| Dependent CompType/CSType → Sponsor CompType/CSType | Input data rate unit/sec |
|---|---|
| Apache2/HttpService→ApacheUtil/UtilityService | 200 |
| Apache2/HttpService→Apache2Prefork/StabilityOfService | 200 |
| Apache2/HttpService→ApacheModdnssd/Httpd | 200 |
| Php5/php5CoreService→Php5Sqlite/embeddableSqlService | 50 |
| Php5/php5CoreService→Php5pdoDataAccessAbstraction | 50 |
| MySql/MySqlDBMS→MyODBCUnix/ODBCInterface | 3000 |

The CtCSType dependency relation is characterized by properties that express the interaction capabilities required by the dependent couple. As introduced in Section 2.1, these capabilities are modeled by instances of class NFProperty associated with the CtCsTypeDependency-Port's NFFlowSpecification of the dependent CSType.

Table II shows the Input Data Rate capacity required by the dependent CompType involved in a CtCSType dependency. For instance, Apache2/HttpService in order to handle the input and output data volume specified in Table I requires ApacheUtil/UtilityService capable of supporting 200 u/s.

The extended ETF model is analyzed in order to extract information on the communication features of the sponsor CompType/CSType, As shown in Table I, the sponsor pair Apache Util/UtilityService can handle 100 u/s. The selected properties are compared to the equivalent properties of the dependency relationship. Once again, the comparison criteria depend on the type of the considered NF properties. By considering the data rate that instances of the ApacheUtil/UtilityService pair need to handle, and the rate at which this pair is able to support Apache2/HttpService, the minimum number of CSIs of UtilityService required to satisfy the dependency can be estimated using the formula presented in (2).

$$\#CSIs_{CSType}^{Sponsor} = \#CSIs_{CSType}^{Dependent} * \left\lceil \frac{RequireDataRate_{CompType/CSType}^{Dependent}}{ProvideDataRate_{CompType/CSType}^{Sponsor}} \right\rceil \quad (2)$$

The same criteria are applied to all the dependencies defined among CompType elements, identifying the number of CSIs of the involved CSTypes for all the CompType/CSType pairs selected for the input module. Table III shows the derived number of CSIs.

TABLE III

Estimated Minimum number of CSIs of a given CSType when provided by components of a given CompType.

| CompType | CSType | Min #CSIs |
|---|---|---|
| Apache2 | HttpService | 4 |
| ApacheUtil | UtilityService | 8 |
| Apache2Prefork | StabilityOfService | 4 |
| ApacheModdnssd | Httpd | 4 |

The process described so far deals exclusively with the input module, i.e., HTTP Server. The analysis of the entity prototypes of other modules requires analysing the inter-module relationships and the interaction capabilities of the selected entity prototypes. Thus, the following analysis focuses on the communication relationship between Apache2/HttpService and php5/php5CoreService of the modules HTTP Server and Interpreter, respectively.

The interaction analysis requires comparing the properties of the flow of data generated/expected as output/input by the pair of CompType/CSType belonging to the input module (pair A), with the input/output properties of the pair belonging to the related module (pair B). Therefore, in the running example, the number of CSIs of type php5CoreService is derived from the interaction capabilities of Apache2/HttpService and php5/php5CoreService. Equation (3) considers the data rate property and specifies the minimum number of CSIs of CSTypeB (the CSType of pair B) as the maximum value between the minimum number of CSIs required to handle the volume of data produced by CompTypeA/CSTypeA and the number of CSIs that can satisfy the volume required by pair A.

$$\#CSIs_{CSTypeB}^{CompTypeB/CSTypeB} = \#CSIs_{CSTypeA}^{CompTypeA/CSTypeA} * \left\lceil \max\left(\frac{DataRate_{CompTypeA/CSTypeA}^{Output}}{DataRate_{CompTypeB/CSTypeB}^{Input}}, \frac{DataRate_{CompTypeA/CSTypeA}^{Input}}{DataRate_{CompTypeB/CSTypeB}^{Output}}\right) \right\rceil \quad (3)$$

Therefore, based on equation (3), 25 CSIs of type php5Core-Service provided by components of php5 are necessary to handle the flow of data produced and required by the 4 CSIs of HttpService (calculated above) when provided by components of Apache2.

The interaction analysis is automatically reapplied to each communication relationship that involves the entity prototypes selected for the input module. Afterwards, the entire dependency analysis is reapplied to the entity prototypes selected for other modules. More specifically, the process considers the pairs of CompType/CSType that interact with those of the input module, i.e., php5/php5CoreService. The required number of CSIs of the sponsor CSType in each dependency relationship is calculated taking into account the previously calculated number of CSIs necessary for satisfying the interaction requirements. Based on Table I and II and considering that the analysis result required 25 CSIs of php5CoreService and 25 CSIs of embeddableSQLService (when provided by components of type php-sqlite and php5-pdo, respectively), 25 CSIs of DataAccessAbstraction are required.

Finally, the analysis considers the communication relationships that link the recently analyzed entity prototypes to entity prototypes belonging to other modules, applying the interaction analysis described above. Therefore, based on the communication relationship between php5sqlite/embeddable-SQLService and MySqlClient/MySqlClient-Service as well as the data rate capabilities shown in Table I, 7 CSIs of type MySqlClientService are required.

The dependency and interaction analysis are recursively applied to the remaining entity prototypes of the considered scenario until covering all the CompTypes/CSTypes selected for every module. Afterwards, for each module, the analysis takes into consideration the dependency at SUType level between entities selected in the same module. The only case verified in the above example concerns module DBMS, where SvcType MySqlClient provided by an SUType Client requires the ScvType MySqlEngine to be provided. Based on this dependency, at least one CompType of Client in providing a CSType (aggregated in MySqlClient) must interact with at least one pair of CompType/CSType in Server and in MySqlEngine, respectively. Therefore, the analysis selects from the extended ETF model the elements aggregated by the involved SvcType and SUType, namely MySqlEngine and Server, which are connected through a CtCst association class. For this purpose, the analysis considers the pairs MySql/MySqlDBMS and MyODBCUnix/ODBC-Interface. The interaction analysis is applied as if these entity prototypes were selected in a dedicated module identified by the service configurator. Consequently, based on the extended ETF model, the pair MySqlClient/MySqlClient Service is able to interact with MyODBCUnix/ODBC-Interface. Thus, considering Table I and equation (3), 3 CSIs of type ODBCInterface are required. In addition, since MySql/MySqlDBMS depends on MyODBCUnix/ODBC-Interface, based on Table II and inverting the formula presented in equation (2), it is estimated that 1 CSI of MySqlDBMS is required.

Phase 10: Calculation of the Required Number of SIs of Each Selected SvcType and Definition of the CSI and SI Templates.

For each SvcType selected in Phase 5 and Phase 7, the required number of SIs is derived from the number of CSIs of each aggregated CSType calculated in Phase 9. For instance, MySvcT1 aggregates HttpService, UtilityService, StabilityOfService and Httpd. In the extended ETF model, each SvcType specifies the number of CSIs for the aggregated CSType capable of being grouped by its SIs. As an example, SIs of type MySvcT1 can aggregate just one CSI of each of the previously mentioned CSTypes.

The minimum number of SIs of each SvcType to be defined is calculated using equation (4). It corresponds to the maximum among the values resulting from the division of the minimum number of CSIs of each CSType calculated in phase 9 by the maximum number of CSIs allowed in each SI of the SvcType specified in the extended ETF model. Each SI has to group a number of CSIs of a given CSType that complies with the MaxNumInstances and MinNumInstances property specified in the extended ETF model (if the SvcType has been generated, these properties equal 1).

$$\#SIs_{SvcType} = \max_{1 \leq i \leq \#CSTypeInSvcType} \left[ \frac{\#CSIs_{CSType_i}}{MaxNumInstances_{CSType_i}^{SI_{ScvType}}} \right] \quad (4)$$

The calculation is applied to all the SvcTypes that have been selected in each scenario. Therefore, based on the previously calculated values and applying equation (4), 8 SIs of type MySvcT1, 25 SIs of type MySvcT2, 7 of type MySqlClient, and 1 of type MySqlEngine are required to satisfy the UR.

Afterwards, for each SvcType, it is necessary to calculate the number of CSIs of each CSType to be grouped by each SI of the SvcType. For instance, it is necessary to estimate how many CSIs of type HttpService, UtilityService, StabilityOfService and Httpd need to be grouped in each SI of type MySvcT1. Equation (5) estimates this value based on the minimum number of CSIs per CSType calculated in phase 9, and the minimum number of CSIs of a CSType per SvcType specified in the extended ETF model.

$$\#CSIs_{CSType}^{SI_{SvcType}} = \quad (5)$$

$$\begin{cases} \left\lceil \frac{\#CSIs_{CSType}}{\#SIs_{SvcType}} \right\rceil = rl, & \text{if } rl > MinNumInstances_{CSType_i}^{SI_{ScvType}} \\ MinNumInstances_{CSType_i}^{SI_{ScvType}}, & \text{else} \end{cases}$$

Based on equation (5) the total number of CSIs to be generated may be greater than the minimum number estimated in previous phase. For instance, after applying equation (5) to the CSTypes of MySvcT1, it is necessary to have 1 CSI of HttpService, UtilityService, StabilityOfService and Httpd in each SI of type MySvcT1. Therefore, the required total number of CSIs to be generated changes from the minimum of 20 calculated in phase 9 and shown in Table III (i.e., 4+8+4+4) to 32 (i.e., 8*(1+1+1+1)).

Figure 8:
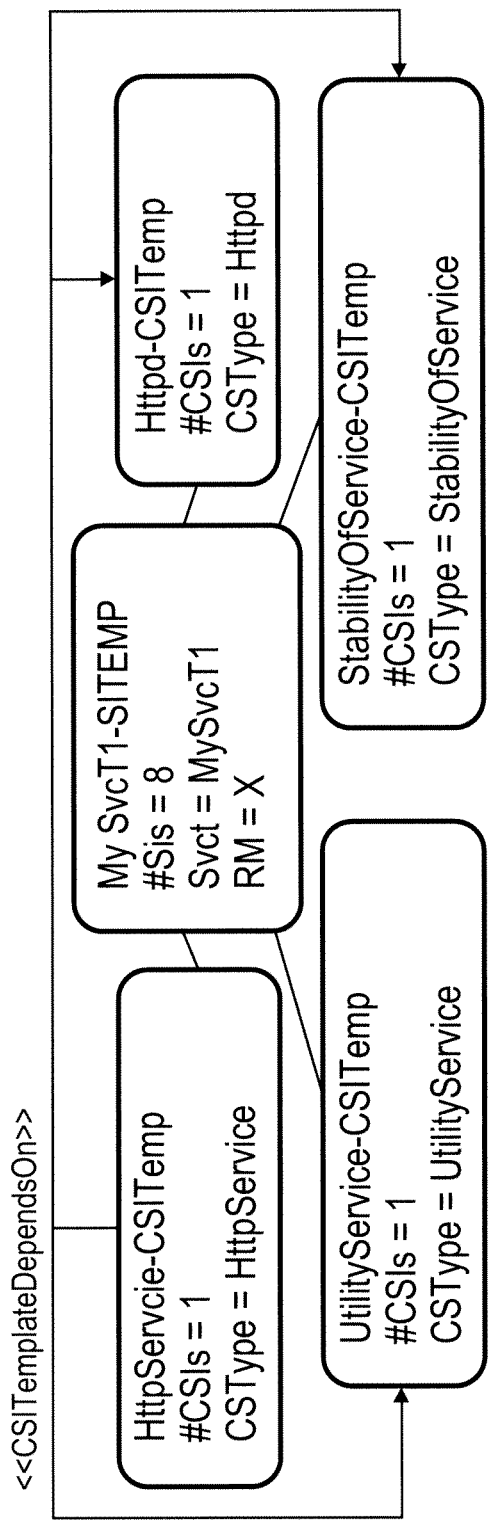
FIG. 8 illustrates an example of SI and CSI templates generated for an HTTPServer module according to one embodiment of the invention.

Once the required number of SIs and CSIs is estimated, the process continues with the definition of CSI and SI Templates. FIG. 8 shows an example of the SI Template and its CSI templates that have been defined for module HttpServer.

A CSI Template is defined for each CSType analyzed in phase 9. This element specifies 1) the involved CSType, 2) the required number of CSIs per SI, 3) the proper CompType, and 4) the possible dependency on other CSI Templates to reflect the dependency relationships involving the considered CompType/CSTypes. If the considered CompType/CSType depends on a sponsor pair, the <<CSITemplateDependsOn>> relationship is defined between the involved generated CSI Templates.

The generated CSI Templates need to be aggregated in order to define the SI Templates for the description of SIs of the selected SvcTypes. An SI Template specifies the SvcType, the number of SIs of this type, as well as the redundancy model and the aggregated CSI Templates. The SI Templates are generated by grouping the proper CSI Templates and by specifying required numbers of SIs calculated at the beginning of this phase. If the considered SvcType depends on a second SvcType, a dependency relation <<SITemplatesDependsOn>> is defined among the involved SvcTypes.

Figure 9:
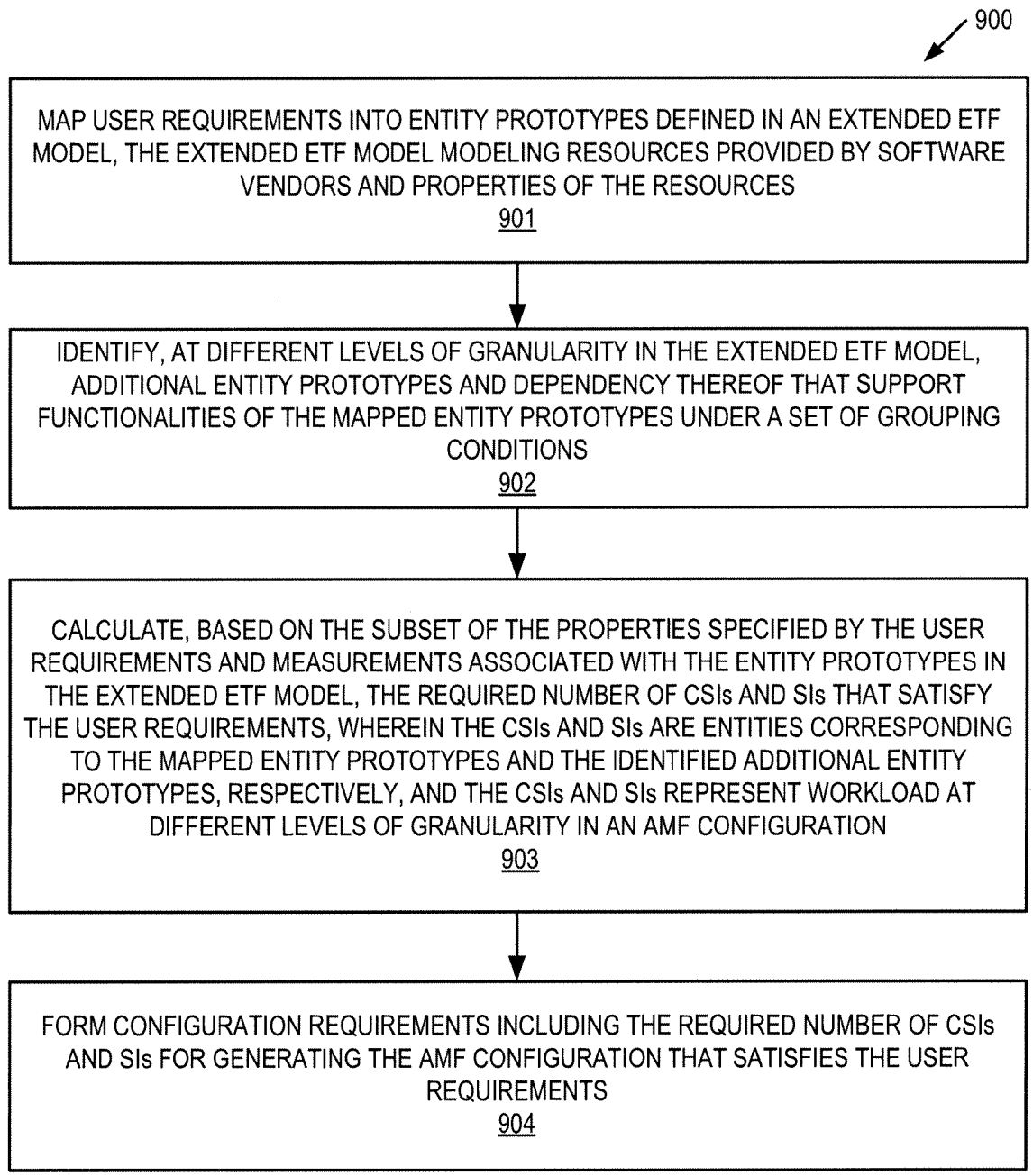
FIG. 9 is a flow diagram illustrating a method of generating configuration requirements from user requirements according to one embodiment of the invention.

FIG. 9 is a flow diagram illustrating a method 900 of generating configuration requirements for an AMF from user requirements according to one embodiment of the invention. The user requirements specify a subset of properties of an AMF configuration. In one embodiment, the properties are measurable properties of the AMF configuration. The method 900 may be performed by hardware (e.g., circuitry, dedicated logic, programmable logic, microcode, etc.), software (e.g., instructions run on a processing device), or a combination thereof. In one embodiment, the method 900 is performed by a computer system 1000 of FIG. 10.

Referring to FIG. 9, in one embodiment, the method 900 begins with a computer system mapping the user requirements into entity prototypes defined in an extended ETF model (block 901). In one embodiment, the entity prototypes are defined at a lowest level of granularity in the extended ETF model. The extended ETF model models the resources that are provided by software vendors and the properties of the resources. In one embodiment, the computer system first decomposes the user requirements into a set of service modules, with each service module providing a functionality that is necessary for satisfying the user requirements. Then the service modules are mapped to the entity prototypes defined at the lowest level of granularity in the extended ETF model. In one embodiment, the mapped entity prototypes include one or more of the CSTypes defined in the extended ETF model.

Subsequently, the computer system identifies, at different levels of granularity in the extended ETF model, additional entity prototypes and dependency thereof that support functionalities of the mapped entity prototypes under a set of grouping conditions (block 902). In one embodiment, the identified additional entity prototypes include one or more of the CompTypes, SvcTypes and SUTypes defined in the extended ETF model. The computer system can also refine the previously selected entity prototypes (including the mapped entity prototypes, the identified additional entity prototypes, and those entity prototypes having a dependency relationship with the mapped and the identified additional entity prototypes) using a communication relationship, which is characterized by a communicate association that models the interactions between two elements having compatible data flows.

In one embodiment, the computer system performs a dependency analysis at the CompType level. The computer system selects a proxy entity prototype or a container entity prototype if one of the mapped entity prototypes requires a proxy to interact with AMF or a container to manage lifecycles. The computer system can also select a sponsor entity prototype that has a dependency relationship with the one of the mapped entity prototypes. In one embodiment, the computer system also performs a dependency analysis at one or more other levels of granularity in the extended ETF model, such as the SUType level.

The computer system then calculates the required number of component service instances (CSIs) and service instances (SIs) that satisfy the user requirements (block 903). The CSIs and Sly are entities corresponding to the mapped entity prototypes and the identified additional entity prototypes, respectively. Further, the CSIs and SIs represent workload at different levels of granularity in an AMF configuration. The calculation is based on the subset of the properties specified by the user requirements and measurements associated with the entity prototypes in the extended ETF model. In one embodiment, the computer system calculates a first required number of CSIs of an input module that receives data from users. Based on the first required number, the computer system further calculates a second required number of CSIs of another module having interactions with the input module. In one embodiment, the computer system also calculates the minimum number of SIs of each of service types (SvcTypes). For each of the SvcTypes, the computer system further calculates the number of CSIs of each of component service types (CSTypes) to be grouped by each SI of the SvcType.

Afterwards, the computer system forms configuration requirements including the required number of CSIs and SIs for generating the AMF configuration that satisfies the user requirements (block 904).

The operations of the flow diagram of FIG. 9 have been described with reference to the exemplary embodiment of FIG. 10. However, it should be understood that the operations of the flow diagrams of FIG. 9 can be performed by embodiments of the invention other than those discussed with reference to FIG. 10, and the embodiment discussed with reference to FIG. 10 can perform operations different than those discussed with reference to the flow diagram. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.).

Figure 10:
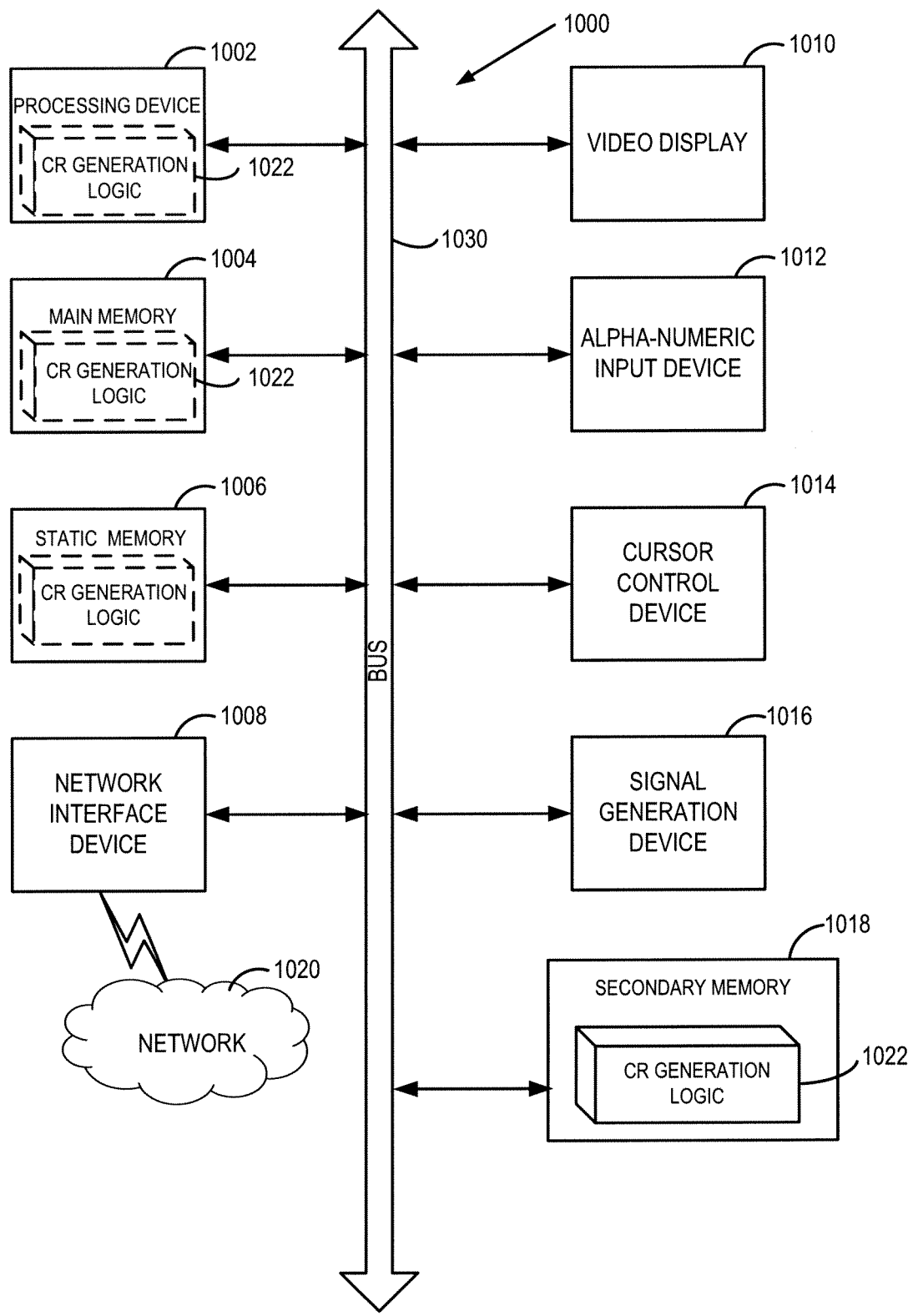
FIG. 10 illustrates a diagrammatic representation of a computer system according to one embodiment of the invention.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002 coupled to a non-transitory computer readable storage medium, such as: a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030. The computer readable storage medium may also include any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or any type of media suitable for storing electronic instructions.

The processing device 1002 represents one or more general-purpose processing devices, each of which can be: a microprocessor, a central processing unit (CPU), a multicore system, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the CR generation logic 1022 for performing the operations and steps of generating configuration requirements from user requirements as described above (e.g., the methods illustrated and described in connection with FIG. 9).

The computer system 1000 may further include a network interface device 1008. A part or all of the CR generation logic 1022 may be transmitted or received over a network 1020 via the network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

In one embodiment, the CR generation logic 1022 may be stored in the non-transitory computer readable storage medium of the secondary memory 1018 and/or the static memory 1006. The CR generation logic 1022 may also reside, completely or at least partially, within the main memory 1004 and/or within the processing device 1002 during execution thereof by the computer system 1000. The CR generation logic 1022 may be stored in the same computer system 1000 or distributed on multiple computer systems 1000.

The term "non-transitory computer readable storage medium" should be taken to include a single medium or multiple media (e.g., a centralized or distributed database, and/or associated caches and servers) that store the one or more sets of instructions.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method of generating configuration requirements for an Availability Management Framework (AMF) configuration from user requirements, the user requirements specifying a subset of properties of the AMF configuration, the method comprising the steps of:

mapping the user requirements into entity prototypes defined in an extended Entity Types File (ETF) model, the extended ETF model modeling resources provided by software vendors and the properties of the resources, wherein the properties include measurable properties that comprise performance measurements and interaction measurements;

identifying by a computer system, at different levels of granularity in the extended ETF model, additional entity prototypes and dependency thereof that support functionalities of the mapped entity prototypes under a set of grouping conditions;

calculating, by the computer system, the required number of component service instances (CSIs) and service instances (Sis) that satisfy the user requirements, wherein the CSIs and Sis are entities corresponding to the mapped entity prototypes and the identified additional entity prototypes, respectively, and the CSIs and Sis represent workload at different levels of granularity in an AMF configuration, wherein the required number is calculated based on the subset of the properties specified by the user requirements and measurements associated with the entity prototypes in the extended ETF model; and forming configuration requirements including the required number of CSIs and Sis for generating the AMF configuration that satisfies the user requirements.

2. The method of claim 1, wherein the step of mapping further comprises the steps of:

decomposing the user requirements into a set of service modules, each service module providing a functionality that is necessary for satisfying the user requirements; and mapping the service modules to the entity prototypes defined at a lowest level of granularity in the extended ETF model.

3. The method of claim 1, wherein the step of mapping further comprises the steps of:

selecting a proxy entity prototype or a container entity prototype if one of the mapped entity prototypes requires a proxy to interact with AMF or a container to manage lifecycles; and selecting a sponsor entity prototype that has a dependency relationship with the one of the mapped entity prototypes.

4. The method of claim 1, wherein the extended ETF model comprises a communicate association that models the interactions between two elements having compatible data flows.

5. The method of claim 1, wherein the step of calculating further comprises the steps of:

calculating a first required number of CSIs of an input module that receives data from users; and based on the first required number, calculating a second required number of CSIs of another module having interactions with the input module.

6. The method of claim 1, wherein the step of calculating further comprises the steps of:

calculating the minimum number of SIs of each of service types (SvcTypes); and for each of the SvcTypes, calculating the number of CSIs of each of component service types (CSTypes) to be grouped by each SI of the SvcType.

7. A computer system adapted to generate configuration requirements for an Availability Management Framework (AMF) configuration from user requirements, the user requirements specifying a subset of properties of the AMF configuration, the computer system comprising:
  a memory to store:
    an extended Entity Types File (ETF) model that models resources provided by software vendors and properties of the resources, wherein the properties include measurable properties that comprise performance measurements and interaction measurements; and
  a processor coupled to the memory, the processor adapted to:
    map the user requirements into entity prototypes defined in the extended ETF model;
    identify, at different levels of granularity in the extended ETF model, additional entity prototypes and dependency thereof that support functionalities of the mapped entity prototypes under a set of grouping conditions;
    calculate the required number of component service instances (CSIs) and service instances (SIs) that satisfy the user requirements, wherein the CSIs and SIs are entities corresponding to the mapped entity prototypes and the identified additional entity prototypes, respectively, and the CSIs and SIs represent workload at different levels of granularity in an AMF configuration, wherein the required number is calculated based on the subset of the properties specified by the user requirements and measurements associated with the entity prototypes in the extended ETF model; and
    form configuration requirements including the required number of CSIs and SIs for generating the AMF configuration that satisfies the user requirements.

8. The computer system of claim 7, wherein the processor is further adapted to:
  decompose the user requirements into a set of service modules, each service module providing a functionality that is necessary for satisfying the user requirements; and
  map the service modules to the entity prototypes defined at a lowest level of granularity in the extended ETF model.

9. The computer system of claim 7, wherein the processor is further adapted to:
  select a proxy entity prototype or a container entity prototype if one of the mapped entity prototypes requires a proxy to interact with AMF or a container to manage lifecycles; and
  select a sponsor entity prototype that has a dependency relationship with the one of the mapped entity prototypes.

10. The computer system of claim 7, wherein the properties are measurable properties that comprise performance measurements and interaction measurements.

11. The computer system of claim 7, wherein the processor is further adapted to:
  calculate a first required number of CSIs of an input module that receives data from users; and
  based on the first required number, calculate a second required number of CSIs of another module having interactions with the input module.

12. The computer system of claim 7, wherein the processor is further adapted to:
  calculate the minimum number of SIs of each of service types (SvcTypes); and
  for each of the SvcTypes, calculate the number of CSIs of each of component service types (CSTypes) to be grouped by each SI of the SvcType.

13. A non-transitory computer readable storage medium having stored therein instructions that, when executed by a computer system, cause the computer system to perform a method of generating configuration requirements for an Availability Management Framework (AMF) configuration from user requirements, the user requirements specifying a subset of properties of the AMF configuration, the method comprising the steps of:
  mapping the user requirements into entity prototypes defined n an extended Entity Types File (ETF) model, the extended ETF model modeling resources provided by software vendors and the properties of the resources, wherein the properties include measurable properties that comprise performance measurements and interaction measurements;
  identifying, at different levels of granularity in the extended ETF model, additional entity prototypes and dependency thereof that support functionalities of the mapped entity prototypes under a set of grouping conditions;
  calculating the required number of component service instances (CSIs) and service instances (SIs) that satisfy the user requirements, wherein the CSIs and SIs are entities corresponding to the mapped entity prototypes and the identified additional entity prototypes, respectively, and the CSIs and SIs represent workload at different levels of granularity in an AMF configuration, wherein the required number is calculated based on the subset of the properties specified by the user requirements and measurements associated with the entity prototypes in the extended ETF model; and
  forming configuration requirements including the required number of CSIs and SIs for generating the AMF configuration that satisfies the user requirements.

14. The non-transitory computer readable storage medium of claim 13, wherein the step of mapping further comprises the steps of:
  decomposing the user requirements into a set of service modules, each service module providing a functionality that is necessary for satisfying the user requirements; and
  mapping the service modules to the entity prototypes defined at a lowest level of granularity in the extended ETF model.

15. The non-transitory computer readable storage medium of claim 13, wherein the step of mapping further comprises the steps of:
  selecting a proxy entity prototype or a container entity prototype if one of the mapped entity prototypes requires a proxy to interact with AMF or a container to manage lifecycles; and
  selecting a sponsor entity prototype that has a dependency relationship with the one of the mapped entity prototypes.

16. The non-transitory computer readable storage medium of claim 13, wherein the extended ETF model comprises a communicate association that models the interactions between two elements having compatible data flows.

17. The non-transitory computer readable storage medium of claim 13, wherein the step of calculating further comprises the steps of:
  calculating a first required number of CSIs of an input module that receives data from users; and based on the first required number, calculating a second required number of CSIs of another module having interactions with the input module.

18. The non-transitory computer readable storage medium of claim 13, wherein the step of calculating further comprises the steps of:
  calculating the minimum number of SIs of each of service types (SvcTypes); and
  for each of the SvcTypes, calculating the number of CSIs of each of component service types (CSTypes) to be grouped by each SI of the SvcType.

* * * * *